United States Patent

Schlossar

[15] 3,675,931

[45] July 11, 1972

[54] SOUND REPRODUCING APPARATUS

[72] Inventor: Edmund Schlossar, Berlin, Germany

[73] Assignee: Mattel Inc., Hawthorne, Calif.

[22] Filed: May 17, 1968

[21] Appl. No.: 730,034

[52] U.S. Cl. ..................... 274/11 R, 274/1 A

[51] Int. Cl. ..................... G11b 25/06

[58] Field of Search ..................... 274/1 A, 11 R, 11 E, 11.12, 274/11 B; 242/55.17

[56] References Cited

UNITED STATES PATENTS

| | | | |
|---|---|---|---|
| 2,287,377 | 6/1942 | Gallier | 274/11 |
| 2,546,680 | 3/1951 | Samuels | 274/11 |
| 3,363,905 | 1/1968 | Ryan | 274/1 |
| 1,979,067 | 10/1934 | Franklin | 274/1 |
| 3,450,239 | 6/1969 | Ryan | 274/1 |

*Primary Examiner*—William D. Martin, Jr.
*Assistant Examiner*—Dennis A. Dearing
*Attorney*—Elwood S. Kendrick and Seymour A. Scholnick

[57] ABSTRACT

A sound reproducing apparatus, particularly for use in toys, utilizing in the specific embodiment shown a tape adapted for use as a sound track carrier. The tape is, in the housing of the sound reproducing apparatus, stored on a reel around which it is normally wound. The reel is coupled to a rotational velocity regulator and, in addition to its rotary movement in winding and unwinding the tape, the reel is also relatively movable in a translational sense with respect to the regulator so as to move the reel and the tape thereon towards or away from a sound pickup device. In operation the tape is first pulled from the reel, which pulling energizes a spring restraint attached to the reel. When the already pulled tape is released the tape is retracted onto the reel. During such retraction the reel moves against the sound pickup device and the tape is thereby "-played," i.e., its sound reproduced, during the retraction of the tape. The operation of the regulator both controls the rotational velocity of the reel and also produces forces which move the reel against the sound pickup device. When the retraction cycle is completed the reel returns to its normal position in which the tape is disengaged from the sound pickup device.

4 Claims, 4 Drawing Figures

PATENTED JUL 11 1972 3,675,931

INVENTOR
EDMUND SCHLOSSAR

BY Seymour A. Scholnick
ATTORNEY

SOUND REPRODUCING APPARATUS

The presence invention relates to a mechanical sound reproducing apparatus, particularly for use in toys and preferably of the type having a regulator for the playback velocity of the sound track relative to the pickup device, and having a drive arrangement whereby the driving arrangement is adapted for a playback from the sound track cooperating with the pickup for sound reproduction during a return of the tape forming the sound track carrier back to a starting position from which the tape was removed during a winding cycle.

Mechanical sound reproducing apparatus intended to be built into toys, such as dolls and the like, are known in many different types. Apparatus capable of relatively natural and high-quality tone reproduction are equipped with regulators, which operate to provide a constant velocity for the relative velocity between the sound carrier track and the pickup device. The coupling of such regulators, particularly of centrifugal governors, to a moving element of the apparatus driving the sound reproduction assembly, herein designated as the driving mechanism, is generally carried out by means of elastic force-transmitting elements. Elastic, such as rubber elements of this kind, have the advantage of relatively quiet operation, but nevertheless they take up a relatively large amount of space, and also suffer dimensional changes in aging, and are subject to a more or less substantial slack in transmitting the force. It is true that gear train arrangements do not exhibit the two last-named disadvantages, but they suffer from a large amount of noise in operation, which interferes with the resulting sound. There are, of course, known ways of reducing the disadvantageous properties of the aforesaid force-transmission means, but these have rather stringent design and production requirements, which must be kept to a minimum where toys are concerned, for economic reasons.

It is an object of the present invention to provide sound reproduction apparatus, which is robust, economical, and extremely sparing of space, all with respect to its intended use in toys.

In accordance with a broad aspect of this invention, there is provided a sound reproduction apparatus, particularly for use in toys, wherein a tape forming a sound track carrier is mounted for cooperation with a pick-up device, the apparatus comprising means for lengthwise displacing the tape in one direction by a pulling action applied to the tape, wherein means are provided which when energized by the pulling action, drive the tape to be lengthwise displaced in the opposite direction. In order to prevent sound production during a winding cycle, i.e., when the tape is pulled, it was found advantageous to cause operative engagement of the tape with the pick-up device only when the tape is driven in the opposite direction, i.e., during the unwinding cycle.

In accordance with features of a preferred embodiment of the sound reproduction apparatus, a drum type of reel having the tape wound thereon and being mounted for rotation about a shaft may be used, the shaft being supported for motion in a direction toward and away from the pick-up device, the pulling action applied to the tape causing the drum and the tape portion on the drum to move away from the pick-up device. Upon release of the tape, the driving means, preferably a spring within the drum, urges the drum, and therewith the tape portion on the drum, to move toward the pick-up device to cause operative engagement between the pick-up device and sound track on the tape. Thus, the spring is wound when, during the winding step, the pulling action causes lengthwise displacement of the tape in one direction, while the spring, when it unwinds, upon release of the tape, drives the tape in the opposite direction, which tape motion corresponds to that cycle of operation in which sounds are produced, which sounds are organized in accordance with at least one sound track on the tape, as opposed to random noises.

In accordance with additional features of the preferred embodiment of this invention, the spring within the drum has one end secured to the drum and its other end secured to the shaft which is stationary with respect to the drum, a gear is provided which is coaxially secured to the drum for rotation therewith, a worm gear whose shaft is oriented tangentially to the gear meshes with the gear, and a governor driven by the worm gear shaft may complete the assembly thus described, thereby to regulate the speed at which the tape is driven by the spring. As a result of this arrangement, the first-mentioned gear is capable of rolling up, along the worm gear, to cause motion of the drum and therewith of the tape portion thereon toward or away from the pick-up device, to produce the effect described above. In practice, particularly when the apparatus is intended to be built in a toy, such as a speaking doll, a housing enclosing the apparatus may be provided with an aperture through which the tape can be pulled to perform the lengthwise displacement and to energize the tape driving means.

Moreover, the inventive solution to the various problems discussed above contemplates, among other features of the preferred embodiment illustrated in the drawings, that the driving means and a velocity-regulated element of the regulator are coupled to each other by a 1-step mechanical force transmission means, which comprises a gear drive, preferably a worm-gear drive. In this exemplary solution for the construction of a sound reproducing apparatus, in accordance with the invention, the driving means is generally the only necessarily moving element for the playback cycle, as the stored energy causes relative motion between the sound track on the tape and the pickup device, in addition to the regulator. In accordance with this, the driving means itself may be associated with the sound track or with the pickup device, or the supporting means for these. Generally, the driving means services to provide the forces needed for the playback process, as well as the forces needed in the return transport resulting in engagement between the sound track and the pickup device no matter whether the sound track is moved with respect to a stationary pickup, this embodiment being shown in the example of the drawing in detail or the inversely. One or more of these tasks, however, can be taken over by the velocity controlled element of the regulator which is accessible from the outside, which, for the attainment of a uniform playback speed is connected with the driving means through a mechanical force-transmission device.

In accordance with the specific feature of the invention, thus described, this force-transmission device is comprised of a single-step gear drive, that is, the different kinds of motion in accordance with the construction of the apparatus (translatory motion and rotary motion) or in accordance with the magnitude of the motion (velocity or angular velocity) between the driving arrangement and the velocity-controlling regulator element, are interconnected for cooperation merely by two mechanical force-transmitting elements which are interlocked with each other, and in which these two force-transmitting elements comprise a gear train, in particular, a worm-gear drive. In this connection, a simple example can be given: a sound track in the form of a tape which is movable back and forth underneath a pickup for playback and for return transport is supported by an element, such as a spring-loaded drum which is secured to a gear, the gear meshing with a screw or helix, which in turn is secured to the shaft of a centrifugal governor at an angle to the plane of the tape. Then, the tape carrying the sound track is the actuator for the driving arrangement.

The regulator used herein acts to control i.e., to regulate the velocity only with respect to forces which tend to produce angular velocities higher than a predetermined velocity. For playback velocities less than that prescribed for the tone reproduction, the regulator has no regulator effect. This behavior is utilized in accordance with the invention in the preferred embodiment, so as to insure that the tape forming the carrier sound track and the pickup device are brought into cooperative relationship with each other when the required playback velocity for natural sound reproduction has been reached. To this end, the driving device and the regulator are arranged so as to be capable of displacement, one with respect to the other, while the gears remain in meshing mutual engagement. Also, the driving device or the regulator is connected with the sound track or with the pickup in such a fashion that the displacement between the driving mechanism and the regulator leads to a displacement between sound track and pickup device, either toward each other or away from each other. As soon, at the commencement of the velocity-controlled playback process, as the driving force applied to the regulator by the driving device attempts to drive the regulator faster than a maximum, predetermined rotation rate, there appears a moment between the driving device and the velocity-controlling regulator element, the movement acting upon the gear drive connection. As a result of this a shift, or displacement occurs between the driving device and the regulator which leads to a reciprocal motion and thereby to an operative association between the pickup device and a sound track. During the reverse transport of the system in opposite direction to that of the playback motion, or during the initial, slow playback cycle, the driving device and the regulator are displaced in the opposite direction to each other, which as a consequence has a motion in the sense of moving the pickup and sound track apart from each other, and thereby a separation between the pickup and the sound track is achieved.

A better understanding of the invention will be gained from the following detailed description of one embodiment of a sound reproduction apparatus constructed in accordance with the invention and shown in the drawings, in which FIG. 1 is a sectional view of a sound reproduction apparatus within a housing;

Figure 4:
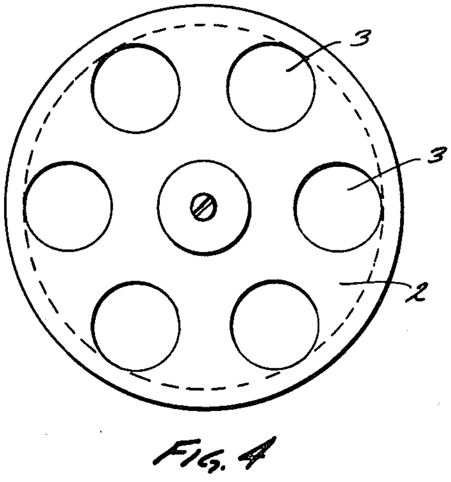
FIG. 4 is a top view of the apparatus of FIG. 1.

Referring to the various figures of the drawing, there is shown a cylindrical housing 1 for the apparatus, of which the top side is covered with a cone-shaped lid 2, which has circular sound apertures 3 (FIG. 4). The other side of the housing 1 is closed by a base 4, which likewise has apertures 5 (FIG. 2) in order to increase the sound output from a diaphragm shown as a membrane 6 of which the periphery is clamped between housing 1 and cover 2, thereby minimizing any damping effect. Membrane 6 is pressed lightly against a pickup stylus 9 by a helical spring 7 interposed between the stylus and the cover 2, the pressure being transmitted through a contact member 8 for the stylus 9, which is attached to the protruding end of a pickup arm 10. Pickup arm 10 is movable in two ways: first, it is mounted for pivoting motion around axis 11 in a plane lying in the longitudinal axis of the pickup stylus; and second, it is movable around the pivot 12 in a plane which is perpendicular to the longitudinal axis of the pickup stylus. Pivot 12 is disposed in a a support 13 which is attached to base plate 14. The pickup stylus 9 points in the direction of the cylindrical surface of a reel shown as a drum 15, around which a tape or band 16 is wound, the tape carrying sound tracks 17. Thus, the tape 16 has a series of parallel sound tracks or grooves 17 thereon, one end of the tape being secured to the drum 15 as shown at 18. Drum 15 is a hollow cylinder and is rotatably journaled about a non-rotating shaft 19. In the interior of the drum there is mounted a spiral spring 20, one end of the spring being attached to the drum at location 21 and the other end being secured to the shaft, so that upon rotation of the drum caused by a pulling action applied to the free end of the tape 16, which end is shown to protrude downwardly from the housing in FIG. 1, the spring is wound up. Or, when the wound up state, the spring exerts a rotational moment upon the drum, as a result of stored mechanical energy.

Figure 2:
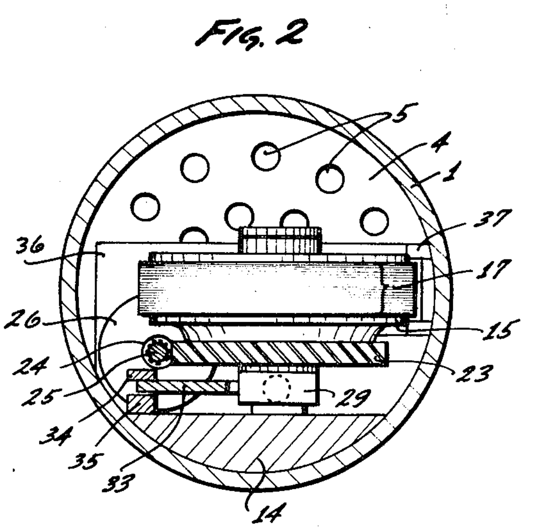
FIG. 2 is a sectional view of the apparatus taken along line II—II of FIG. 1.

It may be seen form FIG. 2 that drum 15 has secured to it a gear 23 of the type capable of meshing with a worm gear, the gear 23 being disposed coaxially with the drum and engaging a worm gear 24, which is supported by, for rotation with, a shaft 25. This worm gear shaft 25 constitutes the velocity regulated element accessible from the outside of the centrifugal governor 26. Worm gear shaft 25 is rotatably supported between a bearing screw 27 and a shaft bearing 28, which are fastened to the housing or, alternatively, to the base plate 14 which in turn is fastened to the housing.

Figure 3:
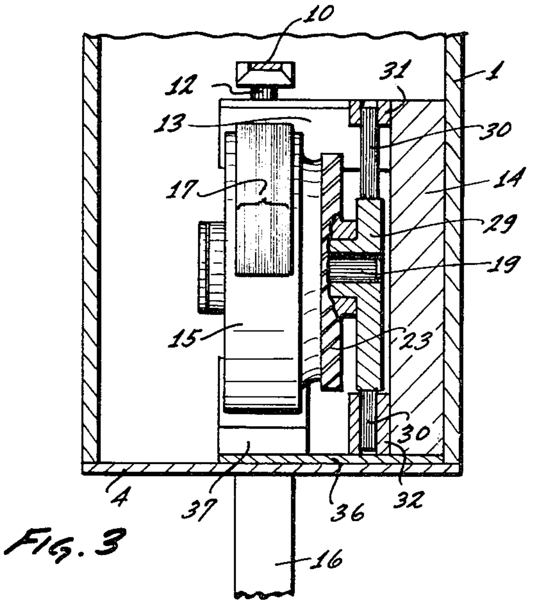
FIG. 3 is a sectional view of the apparatus taken along line III—III of FIG. 1.

The sectional view of FIG. 3 shows the arrangement permitting displacement of the shaft 19 and therewith of the drum 15 in a direction parallel to the longitudinal axis of the worm gear shaft 25. To this end, the shaft 19 is connected to a displacement rod 30 by means of a connecting support 29, the rod 30 being mounted for sliding motion within bores in two bearings 31 and 32 so that it is adapted for longitudinal displacement in the direction of its longitudinal axis. Any possible rotation of the rod 30 which is conveniently formed with circular cross section, about its longitudinal axis is restrained by an arm 33, which is fastened to the connecting support 29 and is held between two stop members 34 and 35. (FIG. 2).

Figure 1:
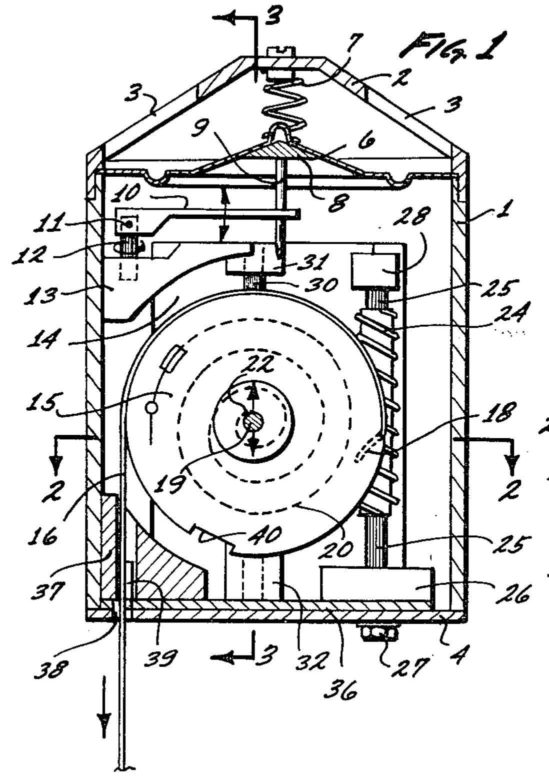

FIG. 1 shows the arrangement of a support plate 36 which is secured to the base plate 14, to which support plate there is secured a guide 37 for the tape 16. The sound tape 16 extends outwardly into the open through an aperture in the guide 37 and an opening 38 through the support plate 36 and a continuing opening through the base plate 4. A lug recess 40 provided in periphery of drum 15 upon winding up of the tape on the drum 15.

The apparatus of the illustrated embodiment operates as follows:

FIG. 1 shows the sound reproduction apparatus in accordance with the invention at the end of the winding cycle. The tape 16 which is normally wound up upon, but, subsequent to winding the apparatus is shown wound off from the drum 15, has most of its length, with its free end, extending through the opening 38, the free end serving as a gripping point for pulling by hand for winding the tape 16 with sound tracks, after a previous playback. By an externally applied pulling action, tape 16, the latter has been wound off the drum 15. By the rotation of the drum which is thereby produced, the spiral spring 20 is wound up, i.e., energy is stored by the spring. It may readily be seen that, during the entire winding process, as a result of the direction and of the amount of the force exerted by the pulling action on the tape, which force must always be greater than the counter force exerted at any instant by the spring which is being wound up, that a force component is applied to the shaft 19 which causes a displacement of the drum and with it of the shaft 19, toward the base of the the housing, as directed by the downwardly directed portion of the double arrow through the shaft 22, see FIG. 1. As may be seen from FIG. 3, the connecting support 29 and rod 30 follow this motion and support 29 then abutts against the bearing 32. Moreover, the sound grooves 17 in the surface of the tape 16 are moved away from the pickup stylus 9, i.e., the tape and the pickup device are separated from each other. The lug 39 on the tape 16 terminates the winding motion when it reaches support plate 36, and thereby prevents a further winding off of the tape from the drum. In this fashion, it is made certain that, at the commencement of the subsequent playback process, the stylus 9 cannot set down on a bare cylindrical surface of the drum, i.e., beyond the drum surface carrying the sound tape. The sound arm 10, which is rotatable about the pivot 12, is limited in this motion by laterally engaging stops (not shown) so that the stylus 9 cannot set down outside of the tape surface carrying sound tracks, or grooves 17. The rotatability of the sound arm 10 about the pivot 12 insures that the stylus 9 can become selectively engaged with any one of the grooves 17 by varying its position by a corresponding oblique positioning of the housing as a result of the action of gravity. It is obvious that, for this reason, the stylus must rest only loosely on the contact member 8 of the membrane 6.

The playback process which is sound-producing unwinding cycle of the arrangement and make us of the energy stored in the spring, is started by releasing the external end of the tape 16 which previously has been pulled out of the housing. The force of the spiral spring which is now permitted to act commences to turn the drum 15 as quickly as possible about the shaft 19 in the playback direction. The centrifugal governor 26, driven by the worm gear 24 and gear 23 secured to the drum 15, however, oppose to any angular velocity of the rotating drum which is greater than the normal predetermined velocity and immediately exerts a resistance against excessive rotational velocity of worm gear shaft 25. Between the worm gear 24 and the gear 23, and therewith the shaft 22 and drum 15, a torquing force appears. The reduction of rotational speed of the worm gear shaft 25 causes gear 23 to roll up along the worm gear 24 as gear 23 continues to be driven into rotation by the energy stored by the spring 20. This rolling-up motion of gear 23 occurs in a direction toward the pick-up device, i.e., upwardly in FIG. 1. In this motion, gear 23 entrains the drum 15, which, in turn, causes shaft 19 to follow in this motion. This displacement of the shaft 19 and thereby of the drum 15 in the direction of the housing cover is indicated in FIG. 1 by the upper half of the double arrow through shaft 19. This displacement is limited by the contact between the tape 16, which is being wound up on the drum, and the support 13. The engagement pressure brought about by the displacement of the stylus 9, then running in one of the sound tracks, or grooves 17, is thereby maintained constant during the entire playback process under the uniform pressure of the helical spring 7, so that the mechanical sound-producing vibrations are transmitted by the stylus 9 to the membrane 6, this transmission thus being achieved with a uniform damping effect.

The invention embodies all of the features which can be inventively perceived in view of the state of the art, from the foregoing description and from the drawings.

I claim:

1. Sound reproducing apparatus for a toy, comprising:
- a frame;
- a single reel rotatably mounted on said frame;
- a tape wound on said reel and having sounds recorded thereon, said tape extending from said reel to a position accessible for manual engagement thereof for unwinding the same from said reel;
- spring means for rotating said reel in a direction to wind said tape thereon and to resist said unwinding;
- sound reproducing means on said frame, said reel and sound reproducing means being relatively movable toward and from each other to engage or disengage said reproducing means and tape;
- governor means limiting the speed of rotation of said reel by said spring means;
- means responsive to rotation of said reel in a tape-unwinding direction to disengage said tape and sound reproducing means and responsive to rotation of said reel in a tape-winding direction to engage said tape and sound reproducing means;
- said last-recited means including a first gear secured to said reel means;
- said second gear being a worm gear tangentially oriented to said first gear, said first gear rolling along said worm gear to cause said translational displacement of said reel.

2. Sound reproducing apparatus for a toy, comprising:
- a frame;
- a single reel rotatably mounted on said frame;
- a tape wound on said reel and having sounds recorded thereon, said tape extending from said reel to a position accessible for manual engagement thereof for unwinding the same from said reel;

- spring means for rotating said reel in a direction to wind said tape thereon and to resist said unwinding;
- sound reproducing means on said frame, said reel and sound reproducing means being relatively movable toward and from each other to engage or disengage said reproducing means and tape;
- governor means limiting the speed of rotation of said reel by said spring means;
- means responsive to rotation of said reel in a tape-unwinding direction to disengage said tape and sound reproducing means and responsive to rotation of said reel in a tape-winding direction to engage said tape and sound reproducing means;
- said reel being mounted for translation on said frame, said last-named means imparting translational movement to said reel toward and from said sound reproducing means;
- a driving connection including gear means intercoupling said reel and said governor for rotationally driving said regulator by said reel;
- said gear means comprising a first gear and a second gear, said second gear being a worm gear and being tangentially meshed with said first gear, said reel being connected to a predetermined one of said first and second gears and said governor being connected to the other one of said first and second gears, said first gear rolling along said second worm gear to cause said translational motion of said reel.

3. The apparatus of claim 2 wherein said first gear is connected to said reel and said second gear is connected to said governor.

4. Sound reproducing apparatus for a toy, comprising:
- a frame;
- a single reel rotatably mounted on said frame;
- a tape wound on said reel and having sounds recorded thereon, said tape extending from said reel to a position accessible for manual engagement thereof for unwinding the same from said reel;
- spring means for rotating said reel in a direction to wind said tape thereon and to resist said unwinding;
- sound reproducing means on said frame, said reel and sound reproducing means being relatively movable toward and from each other to engage or disengage said reproducing means and tape;
- governor means limiting the speed of rotation of said reel by said spring means;
- means responsive to rotation of said reel in a tape-unwinding direction to disengage said tape and sound reproducing means and responsive to rotation of said reel in a tape-winding direction to engage said tape and sound reproducing means;
- said reel being mounted for translation on said frame, said last-named means imparting translational movement to said reel toward and from said sound reproducing means;
- said governor means comprising a rotary member continuously drivingly connected to said reel to be rotated thereby, said rotary member providing substantial resistance to rotation above a predetermined speed, said resistance providing a reaction force, through said driving connection, to produce translational movement of said reel.

* * * * *